United States Patent
Tong et al.

(10) Patent No.: US 10,921,435 B2
(45) Date of Patent: Feb. 16, 2021

(54) METHOD OF DETECTING AN OBJECT

(71) Applicant: NXP USA, INC., Austin, TX (US)

(72) Inventors: Ziqiang Tong, Ottobrunn (DE); Ralf Reuter, Landshut (DE); Arnaud Sion, Munich (DE)

(73) Assignee: NXP USA, INC., Austin, TX (US)

( * ) Notice: Subject to any disclaimer, the term of this patent is extended or adjusted under 35 U.S.C. 154(b) by 141 days.

(21) Appl. No.: 16/039,537

(22) Filed: Jul. 19, 2018

(65) Prior Publication Data
US 2019/0025418 A1 Jan. 24, 2019

(30) Foreign Application Priority Data

Jul. 23, 2017 (EP) .................................. 17182708

(51) Int. Cl.
*G01S 13/42* (2006.01)
*G01S 13/04* (2006.01)
(Continued)

(52) U.S. Cl.
CPC ............ *G01S 13/42* (2013.01); *G01S 7/2813* (2013.01); *G01S 13/04* (2013.01); *G01S 13/44* (2013.01); *G01S 13/931* (2013.01); *H01Q 5/364* (2015.01); *H01Q 9/0407* (2013.01); *H01Q 13/10* (2013.01); *H01Q 21/064* (2013.01); *H01Q 25/002* (2013.01); *H01Q 3/22* (2013.01); *H01Q 25/02* (2013.01)

(58) Field of Classification Search
CPC ........ G01S 13/42; G01S 13/87; G01S 7/2813; G01S 13/44; G01S 13/4463; G01S 13/4409; G01S 2013/0245; G01S 13/04; G01S 13/06; G01S 13/582; H01Q 25/02; H01Q 3/22; H01Q 25/00; H01Q 25/005; H01Q 25/002
USPC ....................................................... 342/147
See application file for complete search history.

(56) References Cited

U.S. PATENT DOCUMENTS 3,512,156 A * 5/1970 Hill ..................... G01S 13/4481
342/154
6,225,958 B1 5/2001 Amano et al.
(Continued)

OTHER PUBLICATIONS

Amadjikpe, A., "Integrated 60-GHz Antenna on Multilayer Organic Package With Broadside and End-Fire Radiation", IEEE Transactions on Microwave Theory and Techniques, vol. 61, No. 1, Jan. 2013.

(Continued)

*Primary Examiner* — Olumide Ajibade Akonai

(57) ABSTRACT

A method (400) of detecting an object using a radar system is disclosed. The method comprises transmitting (401) a first radar beam having a first frequency and first radiation pattern (301) from an antenna (500), the first radiation pattern comprising a peak at zero azimuth angle, and detecting (402) a first signal from the object due to a reflection of the first radar beam. A second radar beam having a second frequency and second radiation pattern (302) is transmitted (403) from the antenna (500), the second radiation pattern comprising a peak at a non-zero azimuth angle. A second signal due to a reflection of the second radar beam from the object is detected (404), and the first signal and the second signal compared (405) to determine an angular location of the object relative to the zero azimuth angle.

20 Claims, 3 Drawing Sheets

Azimuthal angle θ (Deg)

(51) Int. Cl.
  *H01Q 9/04* (2006.01)
  *G01S 13/931* (2020.01)
  *G01S 7/28* (2006.01)
  *G01S 13/44* (2006.01)
  *H01Q 5/364* (2015.01)
  *H01Q 25/00* (2006.01)
  *H01Q 21/06* (2006.01)
  *H01Q 13/10* (2006.01)
  *H01Q 3/22* (2006.01)
  *H01Q 25/02* (2006.01)

(56) References Cited

U.S. PATENT DOCUMENTS

| | | | |
|---|---|---|---|
| 7,250,902 B2* | 7/2007 | Manoogian | G01S 13/4418 342/154 |
| 7,623,062 B2 | 11/2009 | Ding | |
| 7,893,880 B2* | 2/2011 | Orime | G01S 7/03 343/700 MS |
| 2008/0100499 A1* | 5/2008 | Nishimura | G01S 13/42 342/75 |
| 2013/0162491 A1 | 6/2013 | Yu | |
| 2014/0118179 A1* | 5/2014 | Alland | H01Q 1/1271 342/22 |
| 2015/0092623 A1* | 4/2015 | Svendsen | H01Q 13/103 370/278 |
| 2015/0323650 A1* | 11/2015 | Schuman | G01S 7/28 342/17 |
| 2016/0109568 A1* | 4/2016 | Aoyagi | G01S 7/03 342/59 |

OTHER PUBLICATIONS

Ding, X., "Theory and Practice: A Two-Channel Automotive Radar for Three-Dimensional Object Detection", Proceedings of the 12th European Radar Conference, EuMA 2015.

Prinsloo, D.S., "Design of an Active Dual-Mode Antenna with Near Hemispherical Field of View Coverage", IEEE 2013.

\* cited by examiner

METHOD OF DETECTING AN OBJECT

CROSS-REFERENCE TO RELATED APPLICATIONS

This application claims the priority under 35 U.S.C. § 119 of European Patent application no. 17182708.2, filed on 23 Jul. 2017, the contents of which are incorporated by reference herein.

FIELD

The disclosure relates to a method of detecting an object by radar.

BACKGROUND

The antenna array factor (AF) of a conventional three-element antenna array is shown in FIG. 1. The array factor shows the directivity of the array. As can be seen in FIG. 1, the array factor comprises a central peak 101 (i.e. an azimuthal angle of 0°), with equally sized off-centre peaks 102, 103 on either side of the central peak. The range of angles defined by the central peak (i.e. between the dashed lines in FIG. 1) provides a field of view 104 of the array. The ranges of angles 105, 106 defined by the off-centre peaks may be referred to as ambiguous fields of view, due to ambiguities arising in radar signals reflecting from objects located within these angular regions.

FIG. 2 shows the radiation pattern of one of the conventional antennae of the array, as a function of azimuthal angle. The radiation pattern shows the directivity of an individual antenna. As can be seen in FIG. 2, the radiation pattern has a single central maximum, and falls away at non-zero azimuthal angles.

The reduced transmission and detection capability of an individual antenna at non-zero azimuthal angles, shown by the radiation pattern, can reduce the apparent signal of objects located in the ambiguous fields of view 105, 106, introducing ambiguities when detecting objects with a radar system.

SUMMARY

According to a first aspect of the disclosure there is provided a method of detecting an object using a radar system, the method comprising:

transmitting a first radar beam having a first frequency and first radiation pattern from an antenna, the first radiation pattern comprising a peak at zero azimuth angle;

detecting a first signal from the object due to a reflection of the first radar beam;

transmitting a second radar beam having a second frequency and second radiation pattern from the antenna, the second radiation pattern comprising a peak at a non-zero azimuth angle;

detecting a second signal from the object due to a reflection of the second radar beam; and comparing the first signal and the second signal to determine an angular location of the object relative to the zero azimuthal angle.

The zero azimuthal angle may be the azimuthal centre relative to the antenna or, if the antenna is part of an antenna array, of the antenna array.

In conventional radar systems, the radar signal of an object with a high RCS that is located azimuthally off-centre with respect to the array (i.e. in an ambiguous field of view 105, 106) may be misinterpreted as that of a low RCS object located in the central field of view 104.

The method of the present disclosure avoids this ambiguity by transmitting two different radar beams, having two different radiation patterns. By comparing the signals received from the object, an angular location of the object can be determined, and thus it may be determined whether the object is in the central field of view or an ambiguous field of view. In the method, both beams are emitted from the same antenna, reducing hardware costs and manufacturing complexity compared to producing two different beams using two different antennas, and angular resolution is not reduced.

The first beam and second beams may each comprise a range of frequencies, the range of frequencies comprising or centred on the first and second frequencies respectively.

In some embodiments, comparing the first signal to the second signal may comprise determining if the size, for example amplitude, of the first signal is larger or smaller than the size, for example amplitude, of the second signal.

In some embodiments, comparing the first signal to the second signal may comprise determining a ratio of one of the first signal and second signal to the other of the first signal and second signal. For example, a ratio of the amplitude of the first signal to the amplitude of the second signal (or vice versa) may be calculated.

In some embodiments, comparing the first signal to the second signal may comprise subtracting one of the first signal and second signal from the other of the first signal and second signal. For example, the amplitude of the second signal may be subtracted from the amplitude of the first signal (or vice versa).

In some embodiments, comparing the first signal to the second signal may further comprise matching a comparison (e.g. ratio) of the first signal and the second signal to known comparison values, the known comparison values linking the comparison value to an angular location. For example, comparing the first signal to the second signal may further comprise matching a comparison of the first signal and the second signal to a comparison value in a look-up table, the look-up table linking comparison values to angular locations. The known comparison values may be determined by comparing the first radiation pattern and the second radiation pattern, for example taking a ratio of the first radiation pattern to the second radiation pattern. The look-up table may be stored in a computer memory associated with the radar system.

In some embodiments, determining an angular location of the object may comprise determining a range of azimuthal angles in which the object is located. For example, determining an angular position of the object may comprise determining if the object is in a central field of view of the antenna, or an ambiguous field of view of the antenna, wherein the central field of view includes the zero azimuthal angle, and wherein the ambiguous field of view includes the non-zero azimuthal angle of the peak of the second radiation pattern.

In some embodiments, the non-zero azimuthal angle of the peak of the second radiation pattern may be 10° or greater, or 30° or greater, or in the range 30° to 60°. The second radiation pattern may comprise two or more peaks at non-zero azimuthal angles. The peaks may be arranged symmetrically around the azimuthal centre (an azimuthal angle of 0°). The second radiation pattern may have a local minimum at the azimuthal centre.

In some embodiments, the antenna may have a first resonance frequency and a second resonance frequency. The first frequency may substantially equal the first resonance frequency, and/or the second frequency may substantially equal the second resonance frequency.

In some embodiments, the antenna may comprise an antenna array, for example an array of 2, 3, 4, or 5 antennas. The first and second radar beams may be the resultant beams emitted collectively by the antennas of the array.

In some embodiments, the first and second frequencies may be generally within the millimetre band, i.e. 30 to 300 GHz, optionally within a frequency range of 60 GHz to 90 GHz, 75 GHz to 110 GHz, or 77 to 81 GHz. Such frequency ranges correspond to regulated frequency bands for automotive radar systems.

In some embodiments, the method may further comprise switching the operating frequency of the radar system from the first frequency to the second frequency. The operating frequency may determine the frequency or central frequency of the beam emitted by the antenna.

In some embodiments, detecting the first and second signals may comprise receiving the reflections of the first and second radar beams with the antenna. Alternatively, a further antenna or antenna array may be used to detect the reflections of the beams.

According to a second aspect of the disclosure there is provided a radar system comprising an antenna having a first resonance frequency and a second resonance frequency, wherein the radar system is operable to perform the method of any of embodiment of the first aspect.

There may be provided a computer program, which when run on a computer, causes the computer to control a radar system to perform any method according to the first aspect or otherwise disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a non-transitory computer readable medium, which may be a physical computer readable medium, such as a disc or a memory device, or may be embodied as a transient signal. Such a transient signal may be a network download, including an internet download.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
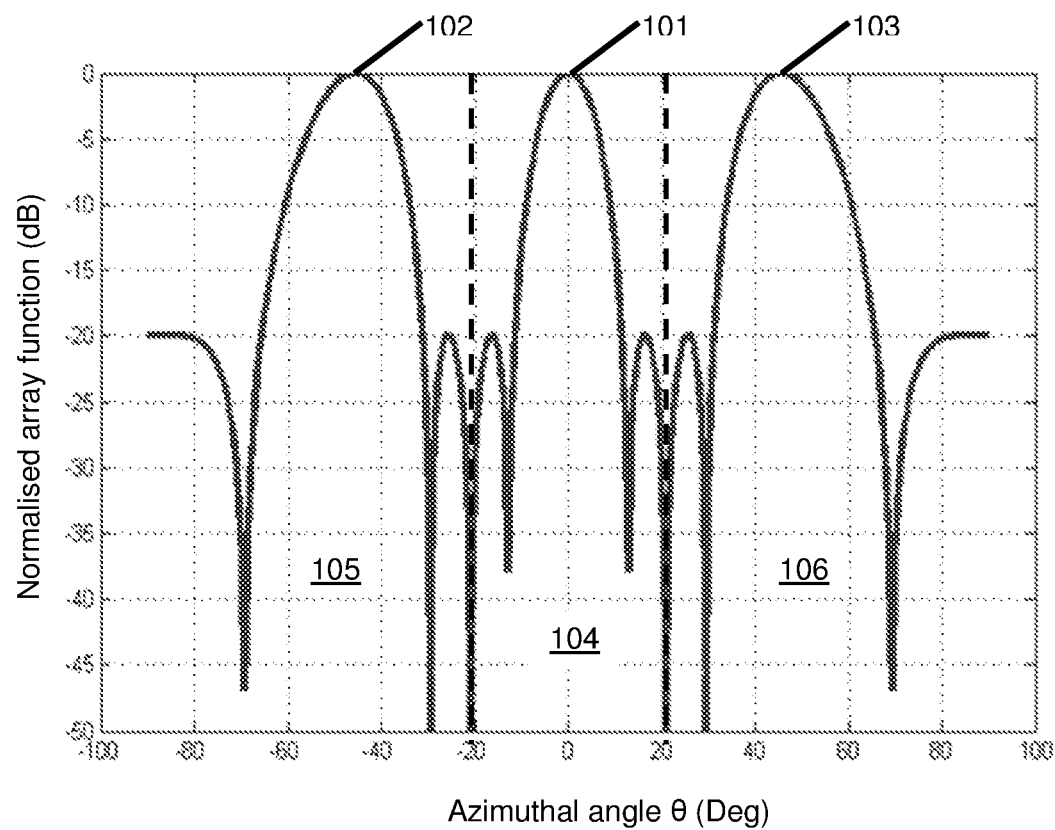
FIG. 1 shows an antenna array factor as a function of azimuthal angle of a conventional 3-element antenna array.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

As described above in relation to FIGS. 1 and 2, emitting a radar beam with a single radiation pattern can lead to ambiguities in the angular location of the object. If, instead, two beams are emitted, each having a different radiation pattern, then the ambiguity can be resolved by comparing the signal detected from each beam.

Figure 2:
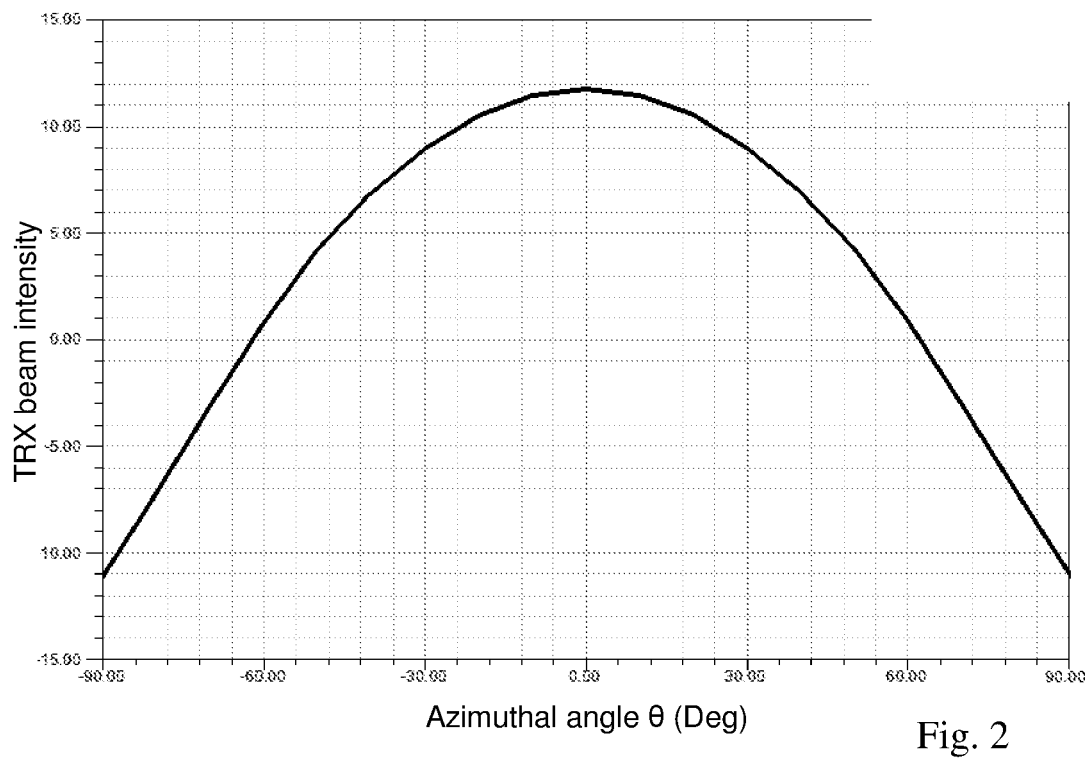
FIG. 2 shows the radiation pattern of a conventional antenna.
Figure 3:
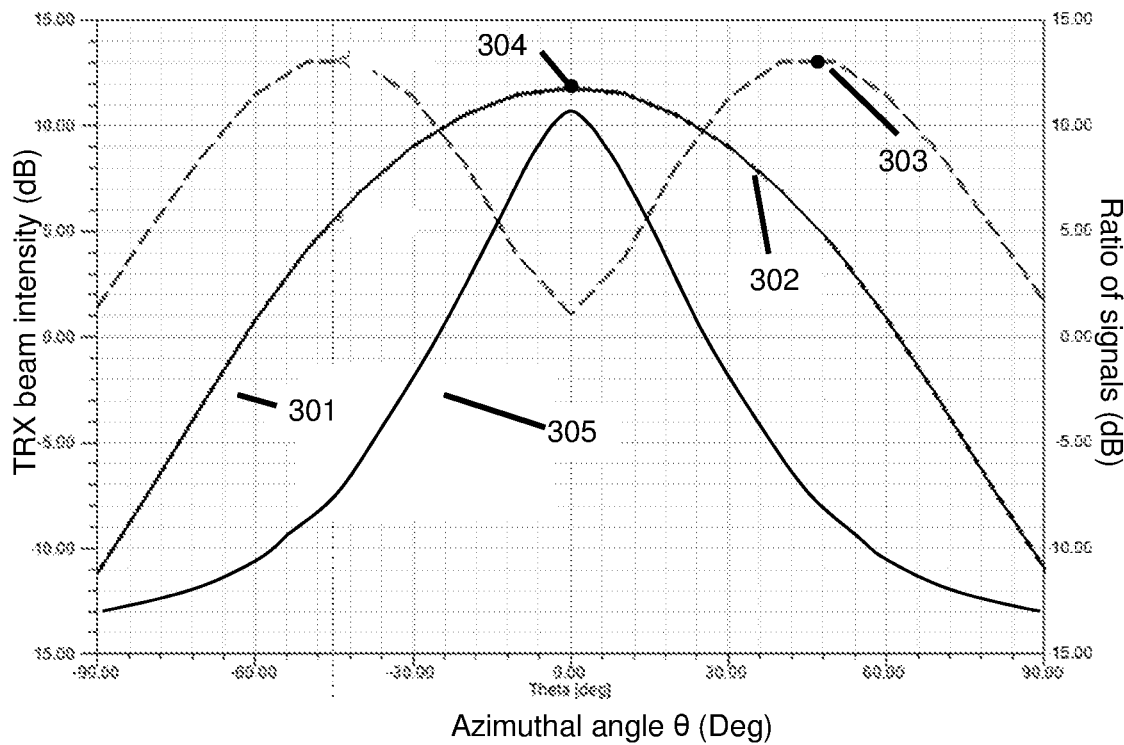
FIG. 3 shows the radiation pattern of a radar beam emitted in accordance with the present disclosure.

FIG. 3 shows the radiation pattern 301 of a first radar beam having a first frequency. The radiation pattern shows the dependence of the intensity of transmitted signal TRX as a function of azimuthal angle. The radiation pattern 301 of the first beam is similar to the radiation pattern of the conventional antenna shown in FIG. 2, comprising a central peak and falling away at non-zero azimuthal angles.

FIG. 3 also shows the radiation pattern 302 of a second radar beam having a second frequency emitted from the same antenna as the first radar beam. In contrast to the first radiation pattern 301, the second radiation pattern 302 has a local minimum at 0°, and two peaks at non-zero azimuthal angles. In this case, the peaks are centred around ±45°, substantially matching the angular location of the peaks of the antenna array function shown in FIG. 1 (for a 3 element array with 3λ/2 spacing). An advantage of using an antenna having different radiation patterns as shown in FIG. 3 is that the two operating frequencies can be used to extend the field of view of the antenna, with the first frequency used for low angles and the second frequency for higher angles.

If the same object is detected by both the first and second beams, the different radiation patterns 301, 302 will result in different amplitudes of signal being measured for each beam.

For example, consider an object at an azimuthal position of 42° relative to an antenna array, marked as position 303 in FIG. 3. This position lies within the ambiguous field of view 104 of FIG. 1. When the object is detected by a reflection of the first radar beam with radiation pattern 301, the amplitude of the received signal will be suppressed due to the radiation pattern 101 of the transmitting/receiving antenna at position 303. The radar system would for example be unable to determine whether the signal represents a high RCS object in the ambiguous field of view, or an object with a lower RCS in the central field of view, for example at position 304 in FIG. 3.

However, the different radiation pattern 302 of the second radar beam supresses and emphasises objects at different azimuthal positions to that of the first radar beam. At 42°, the object is close to a peak in the second radiation pattern 302. Thus when the object is detected with the second radar beam, its signal is not supressed by the radiation pattern.

By comparing the amplitude of first signal detected with the first beam, and the amplitude of second signal detected with the second beam, the ambiguity in the angular location of the object can be removed. For the example radiation patterns 301, 302 shown in FIG. 3, if the amplitude of the first signal is less than that of the second signal, it can be deduced that the object is in an ambiguous field of view. If, on the other hand, the first signal is larger than the second signal, it can be deduced that the object is the central field of view.

The first and second signals may be compared by taking a ratio of the amplitude of the received first signal to the amplitude of the received second signal (or vice versa), and comparing the ratio to previously determined values for that antenna/antenna array. For example, line 305 in FIG. 3 represents the ratio of the first radiation pattern 301 to the second radiation pattern 302 (expressed in dB). When an object is detected, and the ratio of the first and second signal amplitudes calculated, the value of the ratio can be matched to the line 305 to determine the angular location of the object—i.e. in the ambiguous fields of view or in the central field of view.

Figure 4:
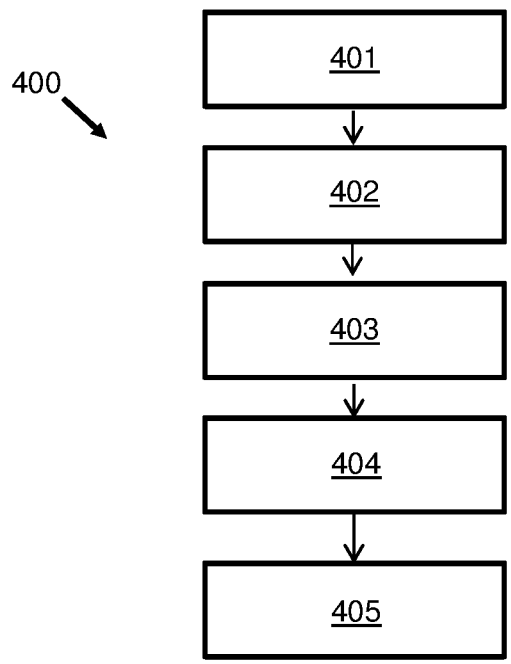
FIG. 4 illustrates a method of detecting an object.

FIG. 4 illustrates a method 400 of detecting an object using a radar system, using such a scheme.

At step 401, a first radar beam having a first frequency and first radiation pattern is transmitted from an antenna, the first radiation pattern comprising a peak at zero azimuth angle.

At step 402, a first signal is detected from the object due to a reflection of the first radar beam.

At step 403, a second radar beam having a second frequency and second radiation pattern is transmitted from the antenna, the second radiation pattern comprising a peak at a non-zero azimuth angle. For example, the operating frequency (i.e. the central frequency at which transmission of signals is driven) of the antenna may be switched from the first frequency to the second frequency, so that the antenna switches to transmitting at the second frequency.

At step 404, a second signal is detected from the object due to a reflection of the second radar beam.

At step 405, the first signal and the second signal are compared to determine an angular location of the object.

It is to be noted that steps 401-404 may be performed in alternative orders. For example, steps 403 and 404 (transmitting and receiving the second beam) may be performed before steps 401 and 402 (transmitting and receiving the first beam). Steps 401 and 403 may be performed before steps 402 and 404 (i.e. both the first and second signals are transmitted before the first and second signals are received).

The antenna may be an antenna array, for example a three-element array, as was the case in FIGS. 1-3.

Figure 5:
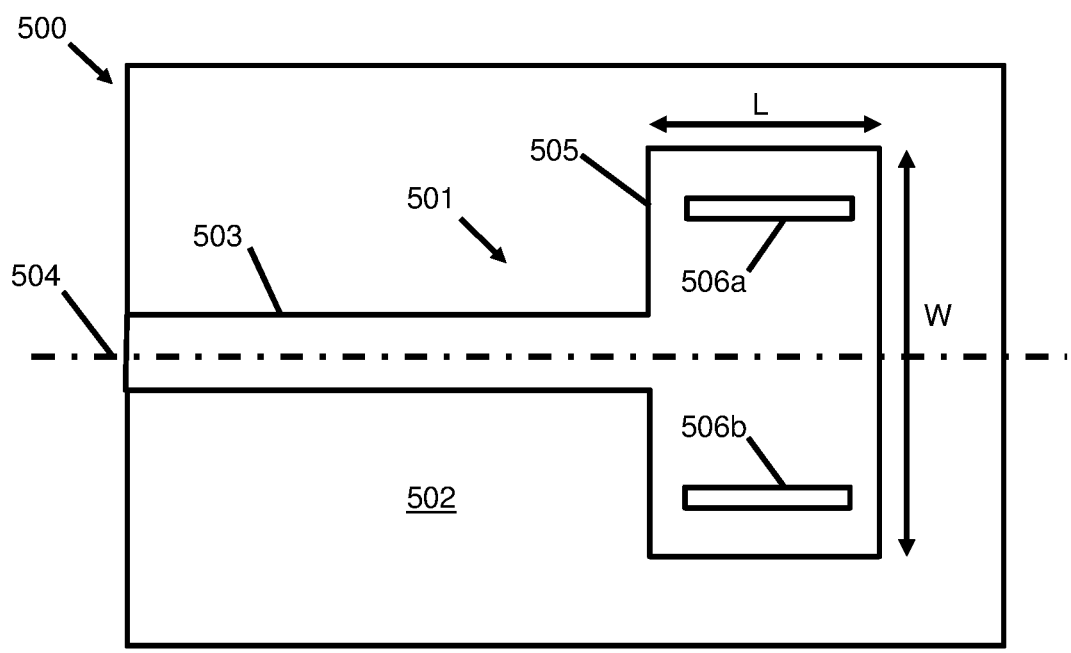
FIG. 5 is a schematic plan view of a patch antenna that may be used to undertake the method of the present disclosure.

FIG. 5 illustrates an example antenna 500 that may be used to transmit the first and second signals, having a first frequency and second frequency respectively. Antenna 500 is configured to have two resonant frequencies within a range of operation. The two resonant frequencies may correspond to the first and second frequencies of the first and second signals respectively. In particular, the first and second frequencies may be peak frequencies of the first and second beams respectively, and may be equal to the first resonant frequency of the antenna 500 and the second resonant frequency of the antenna 500, respectively.

The antenna 500 comprises a rectangular patch antenna 501 on a substrate 502, with a microstrip line 503 connected to a patch 505, the line 503 extending along a central axis 504 and the patch 505 extending either side of the axis 503. The antenna 500 differs from a conventional antenna in that two slots 506a, 506b are provided within the rectangular patch 505 on opposing sides of the axis 504. The slots 506a, 506b result in the patch 505 having two resonant frequencies, one of which is defined by the length L of the patch and the other by the size and position of the slots 506a, 506b. The patch antenna is preferably symmetric about the axis 504. The slots 506a, 506b may be between 0.6 and 0.9 of the length L of the patch antenna 305, and in the example shown are each 0.85 mm in length. The slots 506a, 506b may be positioned such that each slot is between 5% and 20% of the width from the edge of the patch 505, and in the example shown are 0.2 mm from the edges. The slots 506a, 506b may be generally positioned to be equidistant from the edges orthogonal to the central axis 504 and are generally symmetrical about the axis 504. The width of each slot may be generally between 0.05 and 0.3 mm, depending on the overall dimensions of the patch and on manufacturing tolerances.

The two resonant frequencies in this example are at around 76 GHz and 81 GHz. The radiation pattern of the first frequency, 76 GHz, substantially matches pattern 301 shown in FIG. 3. The radiation pattern of the second frequency, 81 GHz, substantially matches pattern 302 shown in FIG. 3. The antenna 500 thus provides two different beams, having two different resonant frequencies, and two different radiation patterns, and so can be used to transmit the first and second beams required by method 400.

An antenna such as antenna 500 may be used in an antenna array. The array may comprise additional antennas 500. The antenna or antenna array may be part of a radar system, such as an automotive radar system.

From reading the present disclosure, other variations and modifications will be apparent to the skilled person. Such variations and modifications may involve equivalent and other features which are already known in the art of radar systems, particularly automotive radar systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A method of detecting an object using a radar system, the method comprising:
   transmitting a first radar beam having a first frequency and a first radiation pattern from an antenna, the first radiation pattern comprising a peak at a zero-azimuth angle;
   detecting a first signal from the object due to a first reflection of the first radar beam;
   transmitting a second radar beam having a second frequency and a second radiation pattern from the antenna, the second radiation pattern comprising a peak at a non-zero azimuth angle;
   detecting a second signal from the object due to a second reflection of the second radar beam; and
   comparing the first signal and the second signal to determine an angular location of the object relative to the zero-azimuth angle.

2. The method of claim 1, wherein comparing the first signal to the second signal comprises determining an amplitude ratio based on a first amplitude of the first signal and a second amplitude of the second signal.

3. The method of claim 1, wherein comparing the first signal to the second signal comprises subtracting one of the first signal and the second signal from the other of the first signal and the second signal.

4. The method of claim 1, wherein comparing the first signal to the second signal further comprises matching a comparison of the first signal and the second signal to a comparison value in a look-up table, the look-up table linking comparison values to angular locations.

5. The method of claim 1, wherein determining the angular location of the object comprises determining a range of azimuthal angles in which the object is located using the first frequency and the second frequency, wherein the first frequency is for low azimuthal angles and the second frequency is for high azimuthal angles.

6. The method of claim 5, wherein determining the angular location of the object comprises determining the object is in a central field of view of the antenna, or an ambiguous field of view of the antenna, wherein the central field of view includes the zero-azimuthal angle and the ambiguous field of view includes the non-zero azimuthal angle of the peak of the second radiation pattern.

7. The method of claim 1, wherein the non-zero azimuthal angle of the peak of the second radiation pattern is 10° or greater, or 30° or greater, or in the range 30° to 60°.

8. The method of claim 1, wherein the second radiation pattern comprises two or more peaks at non-zero azimuthal angles.

9. The method of claim 1, wherein the antenna has a first resonance frequency and a second resonance frequency.

10. The method of claim 9, wherein the first frequency substantially equals the first resonance frequency and the second frequency substantially equals the second resonance frequency.

11. The method of claim 1, wherein the antenna comprises an antenna array.

12. The method of claim 1, wherein one or more of the first frequency and the second frequency are within a frequency range of 60 GHz to 90 GHz, or of 75 GHz to 110 GHz, or of 77 to 81 GHz.

13. The method of claim 1, further comprising:
switching an operating frequency of the radar system from the first frequency to the second frequency.

14. The method of claim 1, wherein detecting the first signal and the second signal comprises receiving the first reflection associated with the first radar beam and the second reflection associated with the second radar beam using the antenna.

15. A radar system comprising an antenna having a first resonance frequency and a second resonance frequency, wherein the radar system is operable to perform the steps comprising:
transmitting a first radar beam having a first frequency and a first radiation pattern from the antenna, the first radiation pattern comprising a peak at a zero-azimuth angle;
detecting a first signal from an object due to a first reflection of the first radar beam;
transmitting a second radar beam having a second frequency and a second radiation pattern from the antenna, the second radiation pattern comprising a peak at a non-zero azimuth angle;
detecting a second signal from the object due to a second reflection of the second radar beam; and
comparing the first signal and the second signal to determine an angular location of the object relative to the zero-azimuth angle.

16. The radar system of claim 15, wherein comparing the first signal and the second signal comprises matching a comparison of the first signal and the second signal to a comparison value in a look-up table, the look-up table linking comparison values to angular locations.

17. The radar system of claim 15, wherein determining the angular location of the object comprises determining a range of azimuthal angles in which the object is located.

18. The radar system of claim 15, wherein the second radiation pattern comprises two or more peaks at non-zero azimuthal angles.

19. The radar system of claim 15, wherein the first frequency substantially equals the first resonance frequency and the second frequency substantially equals the second resonance frequency.

20. The radar system of claim 15, wherein detecting the first signal and the second signal comprises receiving the first reflection associated with the first radar beam and the second reflection associated with the second radar beam using the antenna.

* * * * *